United States Patent
Forsyth et al.

[15] 3,653,687
[45] Apr. 4, 1972

[54] ARTICULATED VEHICLE COUPLING

[72] Inventors: John P. Forsyth; Robert W. Forsyth, both of Upland, Calif.

[73] Assignee: Lockheed Aircraft Corporation, Burbank, Calif.

[22] Filed: Sept. 24, 1970

[21] Appl. No.: 75,119

[52] U.S. Cl. .......................280/476 R, 280/481, 280/87 R, 280/92, 180/14 R
[51] Int. Cl. .........................................................B62d 13/00
[58] Field of Search ................280/87, 92, DIG. 9, 402, 481, 280/419, 492, 493, 494, 476; 180/14, 11, 12, 13, 79.2

[56] References Cited

UNITED STATES PATENTS

| 2,211,909 | 8/1940 | Rancy et al. | 180/14 |
| 2,592,219 | 4/1952 | West et al. | 280/476 |
| 2,928,683 | 3/1960 | Rockwell | 180/12 X |
| 2,980,443 | 4/1961 | Fina | 280/419 X |
| 3,326,312 | 6/1967 | Buller | 180/14 |
| 3,563,329 | 2/1971 | Licari | 180/12 |
| 2,159,395 | 5/1939 | Mersereau | 280/150.5 |

Primary Examiner—Kenneth H. Betts
Attorney—George C. Sullivan

[57] ABSTRACT

An articulated vehicle coupling having axes of yaw, pitch and roll, and wherein a caster spindle and caster wheel are mounted on the yaw axis.

6 Claims, 5 Drawing Figures

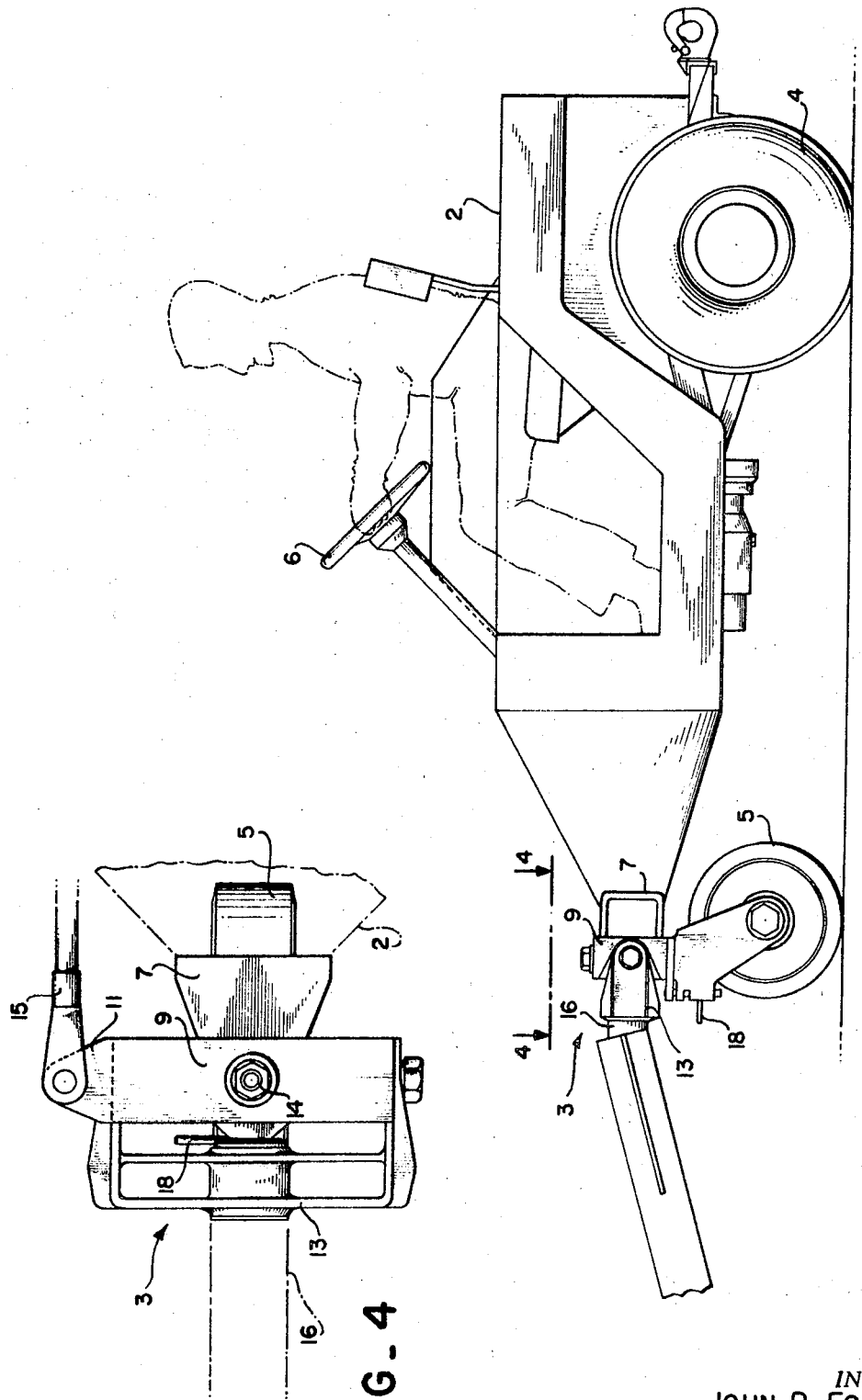

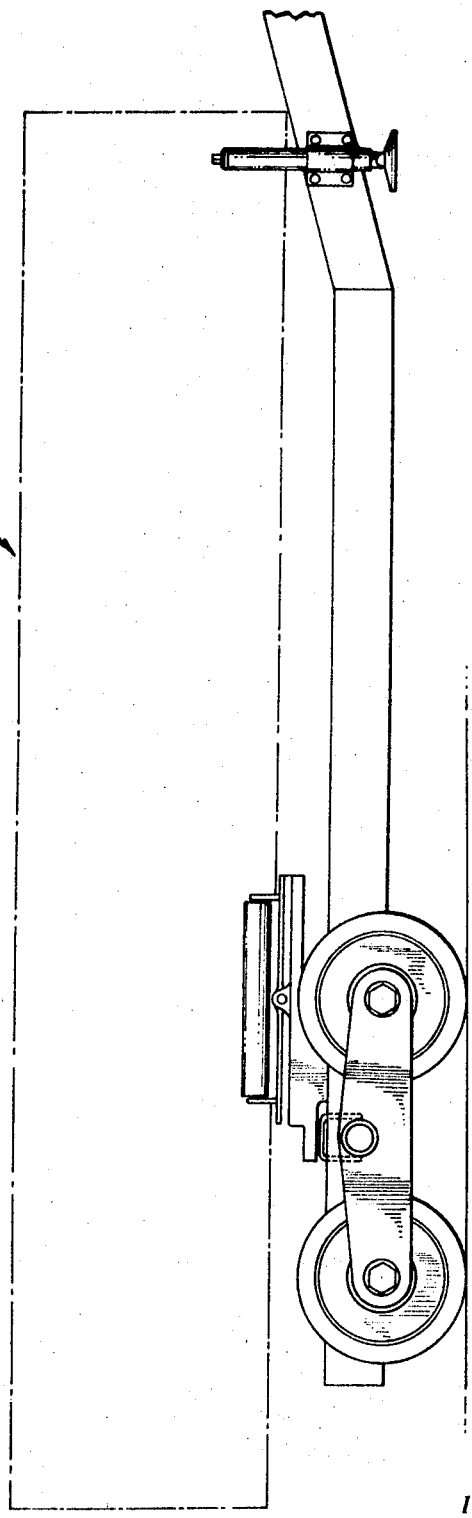

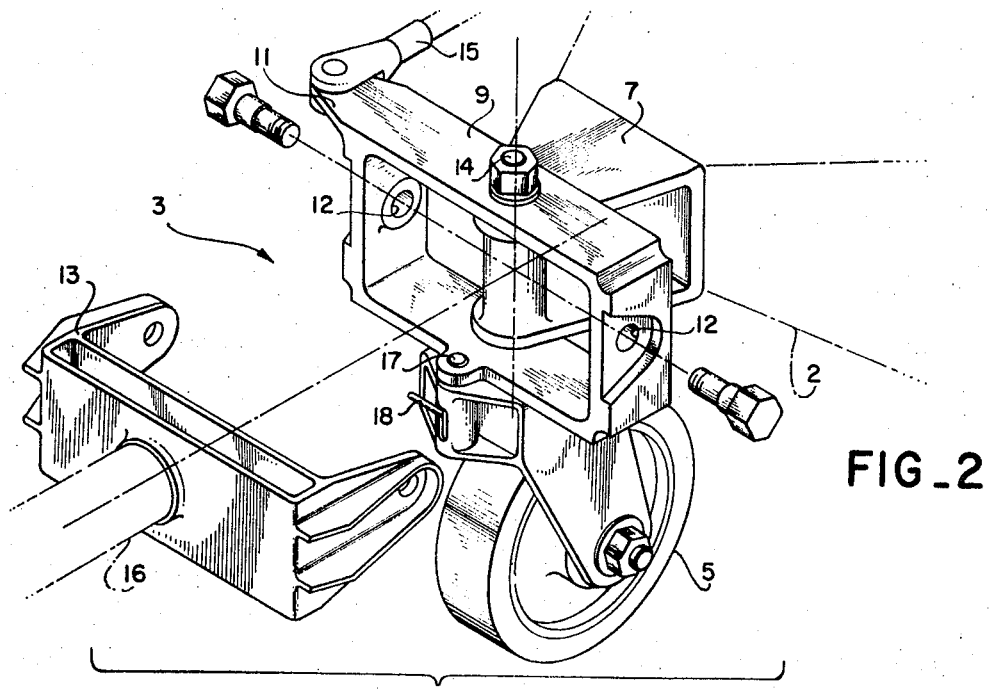
FIG_2
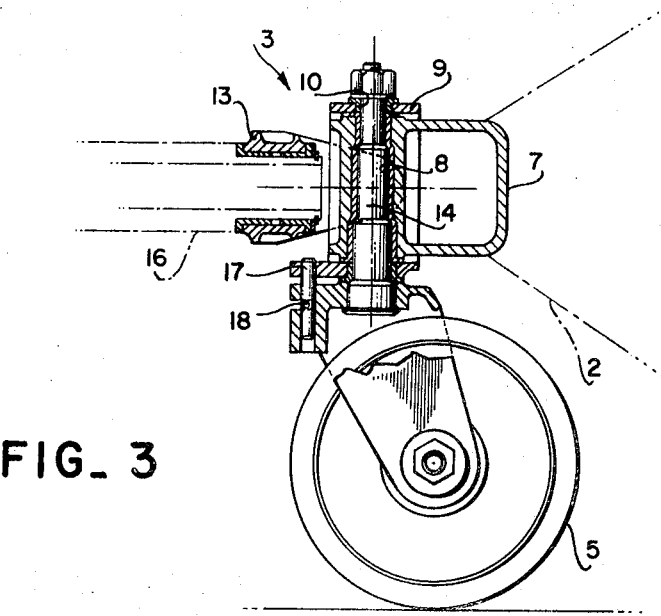
FIG_3

ARTICULATED VEHICLE COUPLING

This invention relates to a vehicle coupling and more particularly to an articulated vehicle coupling which permits greater freedom of use of such vehicles.

Articulated vehicles which steer by chassis articulation are well known. However, such vehicles in general are very limited as to usage by virtue of such articulation.

It is therefore an object of the invention to provide a more versatile articulated vehicle having a simplified coupling.

A further object of the invention is to provide an articulated vehicle in which one of the units may be used as a general purpose vehicle.

These and other objects and advantages of the invention will become more apparent from the following description when taken with the accompanying drawings in which:

FIGS. 1a and 1b are a side view in elevation of an articulated vehicle embodying the invention (1a), and a typical load vehicle attached to the power unit (1b).

FIG. 2 is a partially exploded perspective view of the coupling in accordance with the invention and including a portion of one of the vehicle units.

FIG. 3 is a side view partially in cross section of the coupling and caster wheel;

FIG. 4 is a plan view of the coupling shown in FIG. 3.

Wither reference to FIG. 1, an articulated vehicle is shown having a forward unit 1 (FIG. 1b) and in FIG. 1a a rear unit 2 and a coupling generally designated at 3. The rear unit 2 is preferably a three-wheeled vehicle having two rear drive wheels 4 (one not shown) and a forward caster wheel 5. The rear unit includes a conventional engine, transmission and controls therefor, which are not shown. A steering wheel 6 cooperates with articulated steering and is associated with the coupling unit presently to be described. The forward unit 1 is attached to the coupling 3 by means of the pitch yoke shown in more detail in FIGS. 2-4.

Referring now to FIGS. 2-4, the coupling 3 includes a yaw yoke 7 which is attached to the rear unit 2. The yoke 7 is provided with vertical openings 8 on the longitudinal centerline of the yoke. A coupling spider 9 is provided with vertical openings 10 which register with the openings in the yoke. A steering ram attachment 11 is provided on the coupling spider. Lateral apertures 12 are provided in the spider to which the pitch yoke 13 is attached. A caster spindle 14 is mounted in the openings 10 of the coupling spider and provides a means for attaching the spider to the yoke 7. A steering ram 15 is attached to the steering ram attachment 11 and is coupled to the steering wheel 6 in a conventional manner. The forward unit is connected to the roll ring 16 of the pitch yoke, as shown.

In operation, the two units function together as an articulated vehicle in the usual manner. In such case, the caster wheel is unlocked to the coupling spider to accomplish steering by means of the same steering mechanism. The locking means (shown engaged) may consist of the pin 17 and lever 18 operating on the cam surface as indicated or other equivalent locking means. In this configuration, the rear unit may be employed as a tractor (prime mover) to tow conventional trailers.

The described configuration offers many real advantages over conventional articulated vehicles. The use of articulated steering in the present case permits a variety of designs of the forward unit without the loss of steering precision common to long wheel base combination vehicles. The position of the driver, in the rear unit with the unobstructed forward view of the payload, permits rapid, precise maneuvering of the payload in close proximity to the local surroundings.

While the invention is illustrated in connection with a forward payload unit with part of the load carried by the coupling and caster wheel arrangement, it seems obvious that other units can readily be adapted to the rear propulsion unit. For example, a standard four wheel trailer can be close coupled to the coupling on the roll axis adjacent to the pitch yoke.

What is claimed is:

1. In an articulated vehicle having a pair of body units, an articulated coupling comprising a yaw yoke attached to one body unit, a coupling spider attached to the yaw yoke and mounted on the yaw axis, a pitch yoke mounted on the coupling spider and including a roll axis, a caster spindle joining the coupling spider and yaw yoke and a caster wheel mounted on the spindle.

2. The coupling recited in claim 1, and including means for locking the caster wheel.

3. The coupling as defined by claim 2, wherein the locking means locks the caster spindle to the coupling spider.

4. The coupling as defined by claim 1, wherein the other body unit is attached to the coupling by means of the roll ring of the pitch yoke.

5. The coupling as defined by claim 1, and including steering means.

6. The coupling as defined by claim 5, wherein the steering means includes a steering arm attached to the coupling spider.

* * * * *